United States Patent
Pacheco Da Cunha

(10) Patent No.: US 8,961,277 B2
(45) Date of Patent: Feb. 24, 2015

(54) PERFORATED AIR DUCT FOR TOWERS OF GRAIN DRIERS

(76) Inventor: Otalicio Pacheco Da Cunha, Sao Leopoldo RS (BR)

( * ) Notice: Subject to any disclaimer, the term of this patent is extended or adjusted under 35 U.S.C. 154(b) by 330 days.

(21) Appl. No.: 13/264,668

(22) PCT Filed: Apr. 15, 2010

(86) PCT No.: PCT/BR2010/000130
§ 371 (c)(1),
(2), (4) Date: Nov. 29, 2011

(87) PCT Pub. No.: WO2010/118496
PCT Pub. Date: Oct. 21, 2010

(65) Prior Publication Data
US 2012/0090722 A1   Apr. 19, 2012

(30) Foreign Application Priority Data
Apr. 16, 2009 (BR) .................................. 0901256

(51) Int. Cl.
*F16L 9/00* (2006.01)
*F26B 9/10* (2006.01)
*A01F 25/22* (2006.01)
*F26B 17/14* (2006.01)

(52) U.S. Cl.
CPC ............. *F26B 9/103* (2013.01); *A01F 25/22* (2013.01); *F26B 17/1416* (2013.01); *F26B 2200/06* (2013.01)
USPC ........................................................ 454/177

(58) Field of Classification Search
CPC ............ F26B 9/063; F26B 9/06; F26B 9/066; F26B 2200/06; F26B 17/1416; F26B 9/103; A01F 25/22

USPC ................................. 454/174–182; 138/177
See application file for complete search history.

(56) References Cited

U.S. PATENT DOCUMENTS

| | | | | |
|---|---|---|---|---|
| 106,961 | A | * | 8/1870 | Raymond ...................... 454/175 |
| 1,346,335 | A | * | 7/1920 | Randolph ........................ 34/170 |
| 1,587,582 | A | * | 6/1926 | Galloway ........................ 34/170 |
| 1,685,338 | A | | 9/1928 | Randolph |
| 2,551,460 | A | * | 5/1951 | Peterson ....................... 454/174 |
| 2,660,810 | A | | 12/1953 | Hess |
| 3,300,873 | A | | 1/1967 | Bussell et al. |
| 3,544,091 | A | * | 12/1970 | Hersfeld et al. ................ 432/99 |
| RE27,030 | E | * | 1/1971 | Kline et al. ..................... 34/506 |
| 3,710,449 | A | * | 1/1973 | Rathbun ........................... 34/65 |
| 3,824,705 | A | * | 7/1974 | Ives ................................ 34/170 |
| 3,913,242 | A | * | 10/1975 | Fackler et al. ................. 34/170 |
| 4,006,536 | A | * | 2/1977 | Meiners ......................... 34/169 |
| 4,009,520 | A | * | 3/1977 | Sukup ............................ 34/233 |
| 4,067,120 | A | * | 1/1978 | Bradford ......................... 34/65 |

(Continued)

FOREIGN PATENT DOCUMENTS

| | | | | |
|---|---|---|---|---|
| CA | 2215230 | * | 3/1999 | ............. F26B 17/14 |
| FR | 2569471 | A1 | 2/1986 | |

*Primary Examiner* — Kang Hu
*Assistant Examiner* — Anthony Kandare
(74) *Attorney, Agent, or Firm* — Zarley Law Firm, P.L.C.

(57) ABSTRACT

The invention relates to a V-shaped trough comprising two vertical side walls joined by two converging top walls, said walls being provided with a plurality of openings, thereby making the grain columns between the rows of troughs smaller inside the tower and increasing the sped of drying, since the thickness of the grain columns is reduced, thus shortening the drying time.

4 Claims, 5 Drawing Sheets

(56) References Cited

U.S. PATENT DOCUMENTS

| | | | |
|---|---|---|---|
| 4,086,708 A * | 5/1978 | Westelaken | 34/65 |
| 4,149,844 A * | 4/1979 | Noyes | 432/17 |
| 4,372,053 A | 2/1983 | Anderson et al. | |
| 4,439,933 A * | 4/1984 | Dietrich et al. | 34/65 |
| 4,520,714 A * | 6/1985 | Gullickson | 454/178 |
| 4,566,205 A * | 1/1986 | Schlagel | 34/232 |
| 4,617,744 A * | 10/1986 | Siddoway et al. | 34/168 |
| 5,111,596 A * | 5/1992 | Laurenty | 34/578 |
| 5,443,539 A | 8/1995 | Westelaken | |
| 6,085,439 A * | 7/2000 | Skaarup | 34/225 |
| 6,209,223 B1 * | 4/2001 | Dinh | 34/86 |
| 7,243,857 B2 * | 7/2007 | Kallestad | 236/49.3 |
| 7,568,297 B2 * | 8/2009 | Pierson et al. | 34/218 |
| 7,818,894 B2 * | 10/2010 | Noyes et al. | 34/169 |
| 8,124,009 B2 * | 2/2012 | Danchenko et al. | 422/1 |
| 8,356,420 B2 * | 1/2013 | Morrison et al. | 34/65 |
| 8,556,688 B2 * | 10/2013 | Pacheco Da Cunha | 454/174 |
| 8,684,801 B2 * | 4/2014 | Sukup | 454/174 |
| 2011/0306286 A1 * | 12/2011 | Assie | 454/175 |

\* cited by examiner

Grains Flow

Grain    Grain

PERFORATED AIR DUCT FOR TOWERS OF GRAIN DRIERS

BACKGROUND OF THE INVENTION

The grains drying after the harvest and before the storage is a need due to the strongly hydrated by heaps product's characteristic alterations, such as the respiration or oxidation of glycides, intra-cellular fermentations, development of bacteria and fungi, and all noxious effects resulting from.

The present invention belongs, in general way, to the technological sector of grains drying equipments, and, more specifically, refers to a new conception applied to an air-duct for drying towers.

From the state of technique of this technological sector is known a series of modalities of grain driers: the horizontal fixed layer driers, in which the product remains static in a compartment with perforated floor, through which the heated air is blown; column driers, in which the product, distributed in vertical columns of perforated plates, is submitted to air flows perpendicularly to the columns; concurrent flows driers, in which the grains and the air flow in the same direction; counter-current flow driers, in which the grains and the air are moved in opposite directions; grains static driers, which blow hot air in troughs of V form, through which the grains to be dried pass.

Grains drying towers in static driers are provided of air entry and exit ducts, known as troughs, through which the air flow is feed at one end, flows along the air-duct, and exists through the longitudinal opening on the base, passing through the grains mass, continuing in direction of other troughs in parallel. This air is used to hear or cool, and, consequently, dry the grains that pass through the drying tower, as described in the document PI 0.802.885-0, high performance grains drier, of the same demander of the present request.

This previous process describes a drier that conjugates in its drying tower three air flow principles adopted in the drying processes (concurrent, counter-current, and crossed), besides presenting different air flow values from the top of the tower to its base, taking in consideration the grains nature and their behavior during the drying to obtain the process maximum efficiency, and incorporation as well means for the grains loading box homogenizing, hydraulic unloading, and hot air homogenizing.

SUMMARY OF THE INVENTION

The present invention was conceived for the use in grains high performance driers, but can also be used in other conventional driers.

The invention proposes the perforation of the troughs on their faces in order to reduce the grains column between the trough layers, which increases the drying speed because the grains thickness is finer, consequently reducing the drying time. In this way, in the same static capacity, the production will be increased up to 100% in comparison to a drier of the same technology.

It is the case of a simple solution that provides a surprisingly new technical effect.

BRIEF DESCRIPTION OF THE DRAWINGS

So that the present invention will be fully understood and taken to practice by any technician in this technological sector, the same will be explained in a clear, concise, and sufficient form to enable its reproduction, having as basis the annexed drawings listed herein below, which illustrate and subsidize the same.

DETAILED DESCRIPTION OF THE PREFERRED EMBODIMENT OF THE INVENTION

Figure 1:
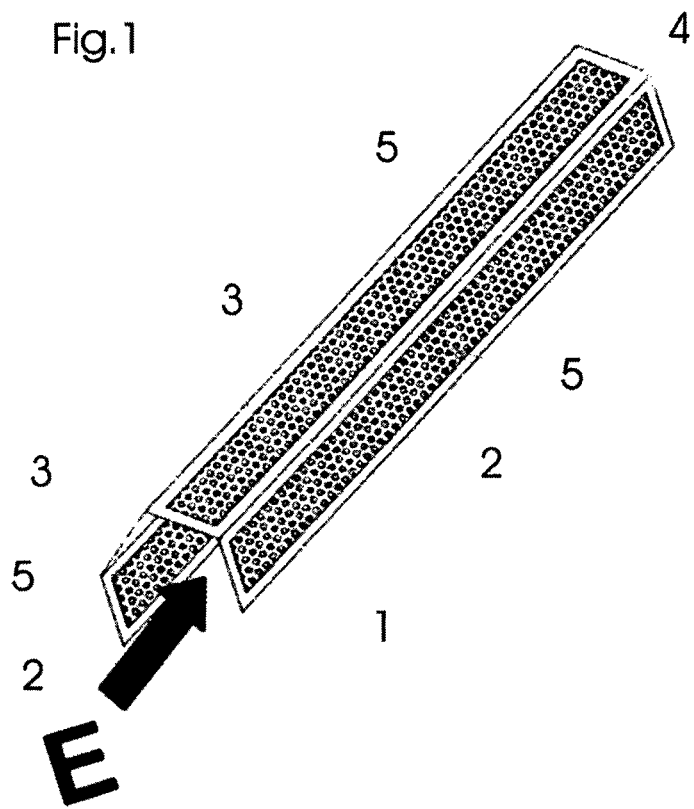
FIG. 1 is a perspective view of a concretization of the proposed trough, in which can be seen the openings on its faces, and where the same is operating at the air entrance on the drier.

As can be deduced in general from the annexed figures, the perforated air-duct for grains drying towers, object of this descriptive report, refers to a trough (1) in V form, made-up by two vertical lateral faces (2), united by two converging superior faces (3), and closed on one end (4), the faces being provided of a multiplicity of openings (5), which reduce the grains column between the trough layers (1) in the tower (FIGS. 6 and 7), which increases the drying speed because the grains thickness is finer, consequently reducing the drying time.

Figure 2:
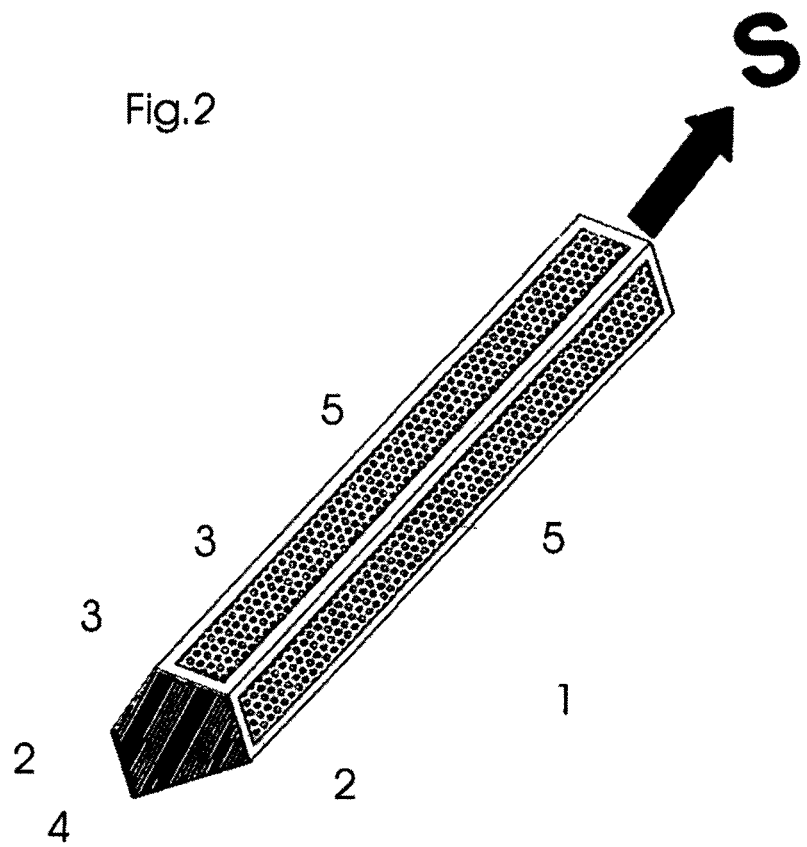
FIG. 2 is a perspective view of a concretization of the proposed trough, in which can be seen the openings on its faces and the same is operating at the air exit on the drier.
Figure 4:
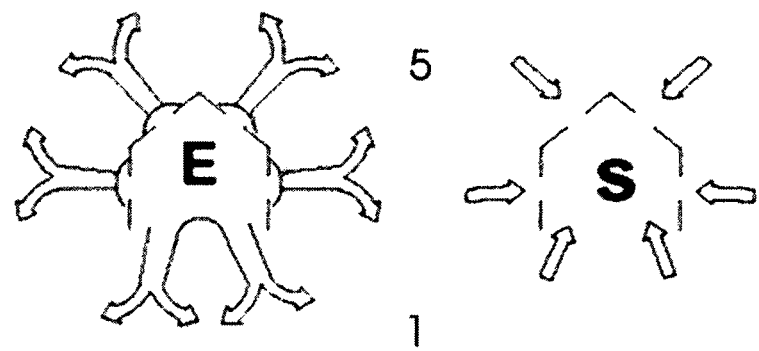
FIG. 4 is a schematic view of the first concretization of the invention, on which are represented the air entry and the corresponding hot air flow, and the air exit, and the used air flow.

One first concretization of the invention is represented in FIGS. 1 and 2, presenting openings (5) on all peripheral faces. The air flow in the troughs, whenever operating as air entry (E) or air exit (S) is represented in FIG. 4.

Figure 3:
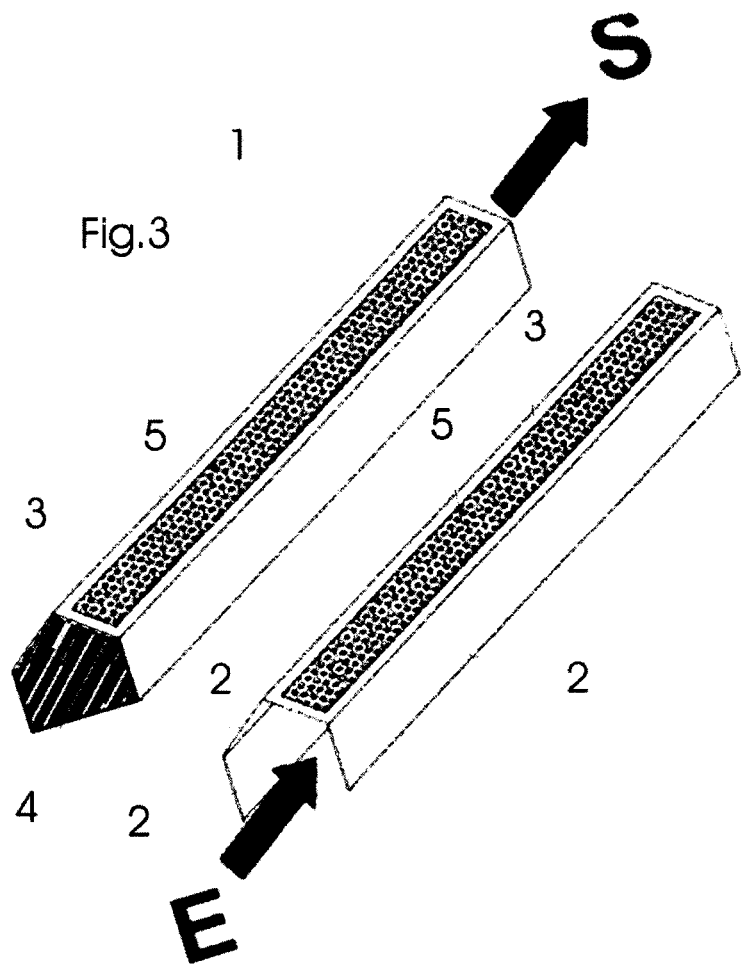
FIG. 3 is a perspective view of a second concretization of the proposed trough, in which can be seen openings just on its superior faces, and the same was represented operating at the air entry and exit on the drier.
Figure 5:
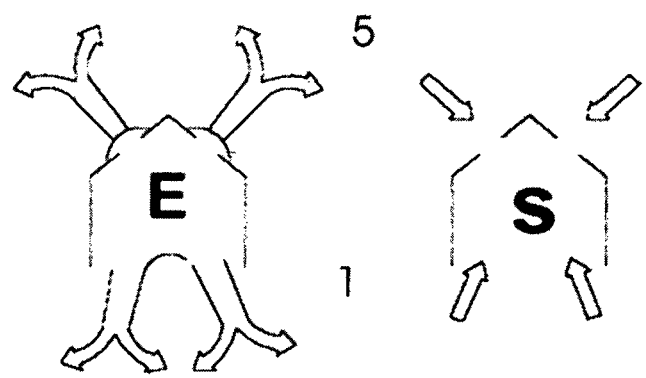
FIG. 5 is a schematic view of the second concretization of the invention, in which are represented the air entry and the corresponding hot air flow and the air exit, and the used air flow.

A second concretization of the invention is represented in FIG. 3, presenting opening (5) just on the converging superior faces. The air flow in the troughs, when operating as air entry (E) or air exit (S) is represented in FIG. 5.

Figure 6:
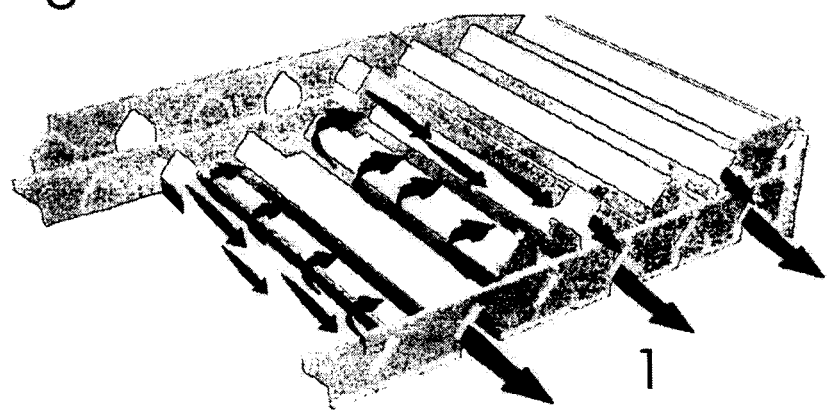
FIG. 6 is a perspective view of the troughs assembling in the drier and of the corresponding air flows.
Figure 7:
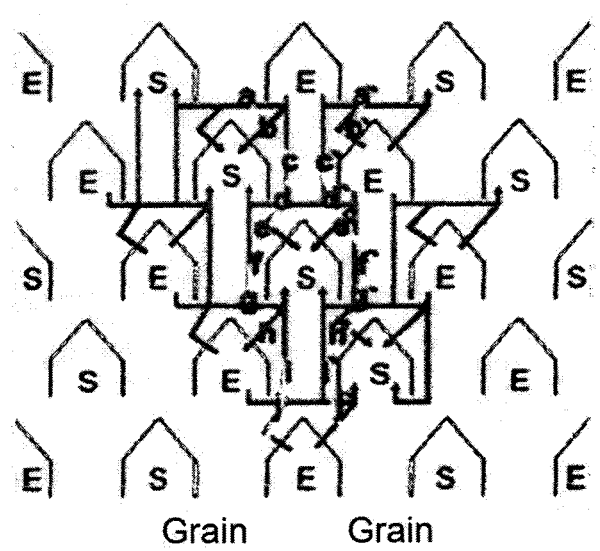
FIG. 7 is schematic view of the troughs assembled in the drier and of the related air flow directions.

Now just referring to FIGS. 6 and 7, we see the effect enabled in the troughs (1) by the openings (5) and the air flow in the troughs on a grains drier.

In FIG. 7, a=crosses to the left, b=descending oblique, c=concurrent, d=crosses to the left, e=concurrent, f=counter-current, g=crosses to the right, h=descending oblique, I=countercurrent, j=crosses to the right, a=crosses to the right, b=counter-current, c=concurrent, d=crosses to the left, e=descending oblique, f=concurrent, g=crosses to the left, h=concurrent, I=counter-current, j=crosses to the right.

The present descriptive report deals about an invention viewed for industrial application, presenting novelty and inventive activity, provided of all requirements determined by the law to receive the requested privilege.

What is claimed:

1. A grain drying tower comprising:
   a first vertical sidewall;
   a second vertical sidewall opposite the first vertical sidewall; and a plurality of perforated air ducts positioned within the grain drying tower extending horizontally between the first vertical sidewall and the second vertical sidewall and having an elongate trough (1) in V form made-up by two vertical lateral faces (2) united by two converging superior faces (3), characterized by a multiplicity of perforation openings (5) being formed through at least either the vertical lateral faces or the converging superior faces (3);

wherein each of the plurality of perforated air ducts includes:

a first end at the first vertical sidewall that is either blocked to form a blocked end or open to form an entry end; and an opposite second end at the second vertical sidewall that is open to form an exit end if the first end is a blocked end and is blocked to form a blocked end if the first end is an open entry end;

wherein rows are formed of a plurality of the perforated air ducts having approximately equal lateral lengths positioned such that positioned such that the lateral lengths are in parallel spaced alignment in a horizontal plane with one another, and the first and second ends are aligned in vertical planes with one another at the first and second vertical sidewalls;

wherein the rows of perforated air ducts are vertically stacked within the grain drying tower;

wherein the vertically stacked rows of perforated air ducts are positioned in an alternating staggered alignment such that the horizontal perforated air duct of a row is offset from adjacent perforated air ducts above and below it from vertically adjacent rows and is positioned between the perforated air ducts of the vertically adjacent row;

wherein the plurality of perforated air ducts in a row are arranged in the row, and the rows are aligned vertically in the tower, to form at the second ends of the perforated air ducts a pattern of exit ends that are horizontally and vertically next to blocked ends of adjacent perforated air ducts;

wherein air flows into the open entry ends at the first end of the plurality of perforated air ducts, continues through a portion of grain stored in the grain dryer tower, and flows out the open exit ends of the perforated air ducts thereby drying the grain.

2. The grain drying tower of claim 1 wherein the multiplicity of perforation openings (5) are formed in the vertical lateral faces of the plurality of perforated air ducts.

3. The grain drying tower of claim 1 wherein the multiplicity of perforation openings (5) are formed on the converging superior faces (3) of the plurality of perforated air ducts.

4. The grain drying tower of claim 1 wherein the plurality of perforated air ducts are arranged in each row, and the rows are aligned vertically in the tower, to form at the first ends of the perforated air ducts a pattern of inlet ends that are horizontally and vertically next to the blocked ends of adjacent perforated air ducts.

* * * * *